US011155221B2

(12) United States Patent
Uchimura et al.

(10) Patent No.: US 11,155,221 B2
(45) Date of Patent: Oct. 26, 2021

(54) POWER SUPPLY DEVICE FOR VEHICLE

(71) Applicant: SUBARU CORPORATION, Tokyo (JP)

(72) Inventors: Takahiro Uchimura, Tokyo (JP); Yuji Ohori, Tokyo (JP); Yuki Natsume, Tokyo (JP); Shota Inudo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 176 days.

(21) Appl. No.: 16/675,544

(22) Filed: Nov. 6, 2019

(65) Prior Publication Data

US 2020/0198562 A1 Jun. 25, 2020

(30) Foreign Application Priority Data

Dec. 21, 2018 (JP) .............................. JP2018-239381

(51) Int. Cl.
*B60R 16/03* (2006.01)
*B60R 16/04* (2006.01)
*H02J 7/14* (2006.01)

(52) U.S. Cl.
CPC .............. *B60R 16/03* (2013.01); *B60R 16/04* (2013.01); *H02J 7/14* (2013.01)

(58) Field of Classification Search
CPC .. B60R 16/03; B60R 16/04; H02J 7/14; H02J 1/12; H02J 7/0048; H02J 7/0047; H02J 7/1423; H02J 7/143; H02J 7/342; H02J 2310/48; Y02T 90/14; Y02T 10/7072; Y02T 10/92; Y02T 10/70

USPC .................................................. 307/9.1–10.1
See application file for complete search history.

(56) References Cited

U.S. PATENT DOCUMENTS

2008/0011528 A1* 1/2008 Verbrugge .............. B60L 50/61
  180/65.29
2017/0259803 A1* 9/2017 Khafagy ................ B60W 20/13

FOREIGN PATENT DOCUMENTS

| JP | 2015-175313 A | 10/2015 |
| JP | 2015-196447 A | 11/2015 |
| JP | 2016-213967 A | 12/2016 |

* cited by examiner

*Primary Examiner* — Toan T Vu
(74) *Attorney, Agent, or Firm* — McGinn IP Law Group, PLLC

(57) ABSTRACT

A power supply device for a vehicle includes first and second systems, a switch disposed between the systems, and first and second controllers. The first system includes a first power supply and a first electrical apparatus. The second system includes a second power supply and a second electrical apparatus. The first mode controller executes a low power mode where the switch is turned on to supply electric power from one of the first and second power supplies to the first and second electrical apparatuses. The second mode controller executes a high power mode where the switch is turned off to supply electric power from the first and second power supplies to the first and second electrical apparatuses, respectively. When a discharge electric current of the second power supply exceeds a threshold during the low power mode, the second mode controller switches the power supply mode to the high power mode.

17 Claims, 10 Drawing Sheets

POWER SUPPLY DEVICE FOR VEHICLE

CROSS-REFERENCE TO RELATED APPLICATIONS

The present application claims priority from Japanese Patent Application No. 2018-239381 filed on Dec. 21, 2018, the entire contents of which are hereby incorporated by reference.

BACKGROUND

The disclosure relates to power supply devices to be mounted in vehicles.

Power supply devices to be mounted in vehicles are equipped with a power supply including a power storage and a generator. For instance, the power storage may be a lead or lithium ion battery, and the generator may be an alternator or integrated starter generator (ISG). Some of such power supply devices are further equipped with various controllers, electric actuators, and other electrical apparatuses, all of which are coupled to the power supply, as disclosed in Japanese Unexamined Patent Application Publication Nos. 2016-213967, 2015-175313, and 2015-196447.

SUMMARY

An aspect of the disclosure provides a power supply device to be mounted in a vehicle. The power supply device includes a first power supply system, a second power supply system, a switch, a first mode controller, and a second mode controller. The first power supply system includes a first power supply that includes a first power storage and a first generator, and a first electrical apparatus coupled to the first power supply. The second power supply system includes a second power supply that includes a second power storage and a second generator, and a second electrical apparatus coupled to the second power supply. The switch is disposed between the first power supply system and the second power supply system is configured to be turned on to couple the first power supply system to the second power supply system or turned off to separate the first power supply system from the second power supply system. The first mode controller is configured to execute, as a power supply mode, a low power mode in which the switch is turned on to supply electric power from one of the first power supply and the second power supply to both the first electrical apparatus and the second electrical apparatus. The second mode controller is configured to execute, as the power supply mode, a high power mode in which the switch is turned off to supply electric power from the first power supply to the first electrical apparatus and to supply electric power from the second power supply to the second electrical apparatus. When a discharge electric current of the second power supply exceeds a threshold during execution of the low power mode, the second mode controller switches the power supply mode from the low power mode to the high power mode.

An aspect of the disclosure provides a power supply device to be mounted in a vehicle. The power supply device includes a first power supply system, and circuitry. The first power supply system includes a first power supply that includes a first power storage and a first generator, and a first electrical apparatus coupled to the first power supply. The second power supply system includes a second power supply that includes a second power storage and a second generator, and a second electrical apparatus coupled to the second power supply. The switch is disposed between the first power supply system and the second power supply system is configured to be turned on to couple the first power supply system to the second power supply system or turned off to separate the first power supply system from the second power supply system. The circuitry is configured to execute, as a power supply mode, a low power mode in which the switch is turned on to supply electric power from one of the first power supply and the second power supply to both the first electrical apparatus and the second electrical apparatus. The circuitry is configured to execute, as the power supply mode, a high power mode in which the switch is turned off to supply electric power from the first power supply to the first electrical apparatus and to supply electric power from the second power supply to the second electrical apparatus. When a discharge electric current of the second power supply exceeds a threshold during execution of the low power mode, the circuitry switches the power supply mode from the low power mode to the high power mode.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the following, some embodiments of the technology are described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

When a power supply that supplies electric power to electrical apparatuses is designed, its output is determined based on the total power consumption of the electrical apparatuses. More specifically, the output of the power supply is set high enough to continue to supply a sufficient amount of electric power to all the electrical apparatuses even if one electrical apparatus, such as a high-power sheet heater, is rapidly activated to consume a large amount of electric power. Setting the output of the power supply in this manner, however, may involve a large body and high cost. Therefore, it is preferable for power supplies to be able to supply a sufficient amount of electric power to the electrical apparatuses with their output lowered.

It is desirable to provide a power supply device that can supply a sufficient amount of electric power to electrical apparatuses with the output of its power supply lowered.

Configuration of Vehicle

Figure 1:
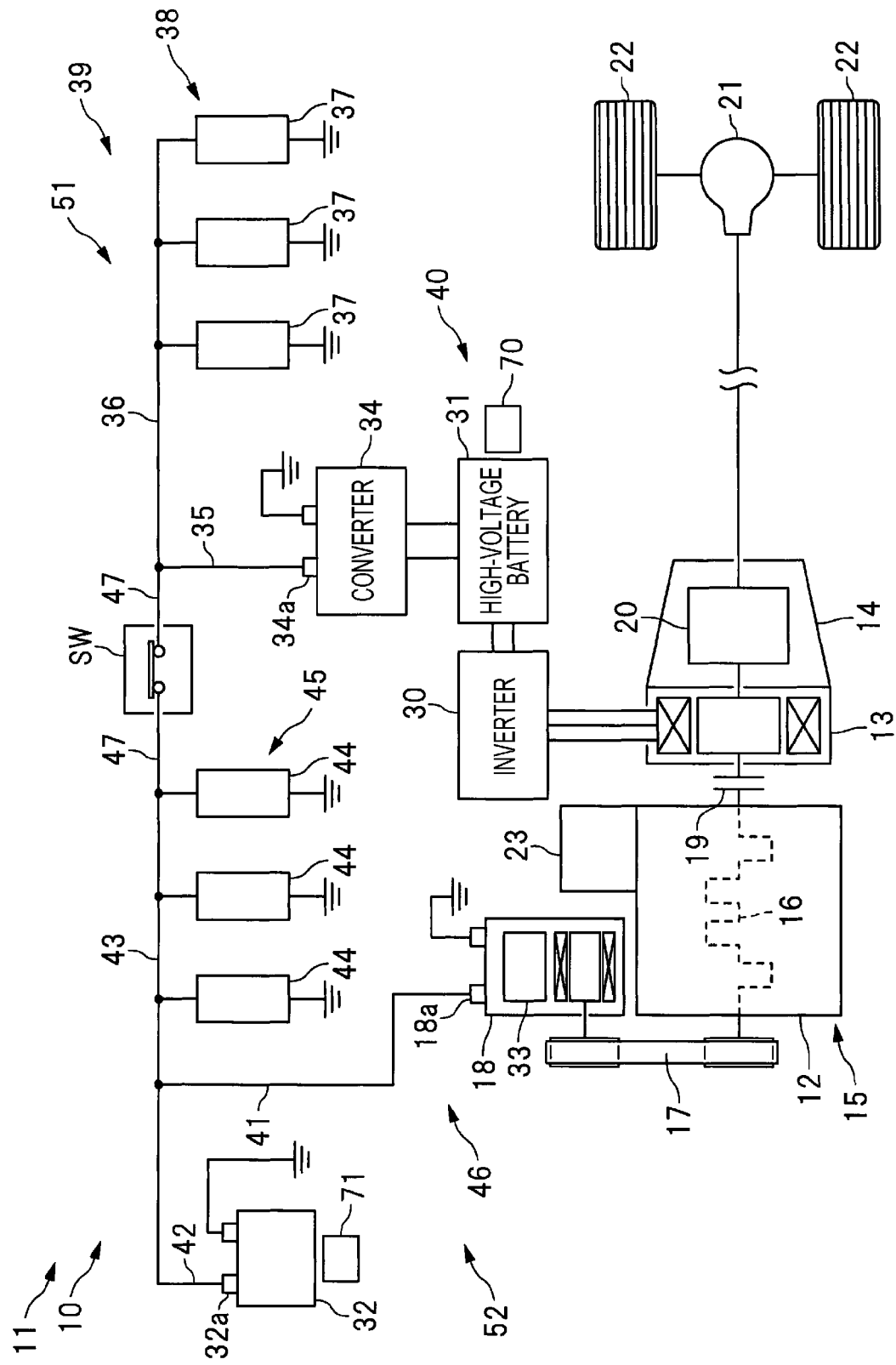
FIG. 1 schematically illustrates an example of a configuration of a vehicle equipped with a power supply device for a vehicle according to an embodiment of the disclosure.

FIG. 1 schematically illustrates an example of a configuration of a vehicle 11 equipped with a power supply device 10 according to an example of the disclosure. As illustrated in FIG. 1, the vehicle 11 is equipped with a power train 15 including an engine 12, a motor generator 13, and a transmission 14. The engine 12 has a crankshaft 16, a first end of which is coupled to a starter generator 18 via a belt mechanism 17 and a second end of which is coupled to the motor generator 13 via a clutch mechanism 19. The motor generator 13 is coupled to a variable-speed mechanism 20 in the transmission 14, and the variable-speed mechanism 20 is coupled to wheels 22 via a differential mechanism 21 and other members. The engine 12, which may be an internal combustion engine, has an engine accessory 23 including an injector and an ignitor.

The motor generator 13 provided in the power train 15 is coupled to a high-voltage battery 31 via an inverter 30. The high-voltage battery 31 may be, for instance, a lithium ion battery or a lead battery with a terminal voltage of about 100 V. The motor generator 13, when being in a power running state, is supplied with the electric power from the high-voltage battery 31 and transmits motor power to the wheels 22, thereby driving the wheels 22. Then, the motor generator 13, when being in a power generation mode during the deceleration of the vehicle 11, supplies electric power to the high-voltage battery 31, thereby charging the high-voltage battery 31.

The starter generator 18 coupled to the engine 12 is also coupled to a low-voltage battery 32. The low-voltage battery 32 may be, for instance, a lithium ion battery or a lead battery with a terminal voltage of about 12 V. The starter generator 18 may be an ISG that serves as both a generator and a motor. For instance, when the remaining charged amount, or the SOC, of the low-voltage battery 32 decreases below a lower limit, the starter generator 18 enters a power generation state. When starting rotating the engine 12 or when assisting the engine 12 in starting moving or accelerating the vehicle 11, the starter generator 18 enters a power running state. The starter generator 18 has an ISG controller 33 to regulate an electric current supplied to a starter coil or a field coil. The ISG controller 33 may include an inverter, a regulator, a microcomputer, and various sensors.

When the clutch mechanism 19 disposed between the engine 12 and the motor generator 13 is disengaged, the transmission of the power generated by the motor generator 13 is not transmitted to the engine 12 so that the motor generator 13 solely runs the vehicle 11. When the clutch mechanism 19 is engaged, the power of the motor generator 13 is transmitted to the engine 12 so that both the engine 12 and the motor generator 13 run the vehicle 11 in combination.

Power Circuit

As illustrated in FIG. 1, the motor generator 13 is coupled to the high-voltage battery 31 via the inverter 30. The high-voltage battery 31 is coupled to a converter 34 that converts the voltage of the high-voltage battery 31. The converter 34 has a positive electrode terminal 34a coupled to a positive line 35, which is joined to a positive line 36. The positive line 36 is linked to a first electrical apparatus group 38, which includes a plurality of first electrical apparatuses 37 each of which serves as any given actuator or controller, for instance. The power supply device 10 is equipped with a power circuit 39 having a first power supply system 51. Components of the first power supply system 51 in the power circuit 39 are the motor generator 13, the inverter 30, the high-voltage battery 31, the converter 34, and the first electrical apparatuses 37 described above. In short, the first power supply system 51 includes a first power supply 40 and the first electrical apparatuses 37 coupled to the first power supply 40; the first power supply 40 includes the motor generator 13 and the high-voltage battery 31. In one example, the motor generator 13 may serve as a "first generator", and the high-voltage battery 31 may serve as a "first power storage". As illustrated in FIG. 1, the first power supply 40 is equipped with the converter 34.

The starter generator 18 has a positive electrode terminal 18a coupled to a positive line 41. The low-voltage battery 32 has a positive electrode terminal 32a coupled to a positive line 42, which is joined to the positive line 41. Coupled to the node between the positive lines 41 and 42 is a positive line 43, which is linked to a second electrical apparatus group 45. The second electrical apparatus group 45 includes a plurality of second electrical apparatuses 44 each of which serves as any given actuator or controller, for instance. In short, the power circuit 39 in the power supply device 10 is equipped with a second power supply system 52 that includes: a second power supply 46 having the starter generator 18 and the low-voltage battery 32; and the second electrical apparatuses 44 are coupled to the second power supply 46. In one example, the starter generator 18 may serve as a second generator and a generator motor, and the low-voltage battery 32 may serve as a second power storage.

Disposed between the first power supply system 51 and the second power supply system 52 described above is a current-carrying line 47 via which the first power supply system 51 is coupled in parallel to the second power supply system 52. On the current-carrying line 47 is a switch SW that is turned on or off. When the switch SW is in an ON state, the first power supply system 51 is coupled to the second power supply system 52, whereas when the switch SW is in an OFF state, the first power supply system 51 is separated from the second power supply system 52.

The switch SW may be a semiconductor switch made of a metal oxide semiconductor field effect transistor (MOSFET), for instance. Alternatively, the switch SW may be a mechanical switch that is turned on or off by means of electromagnetic force. The "ON state" of the switch SW refers to a state where the contact points of the switch SW are in contact with each other and an electric current can flow therebetween. The "OFF state" of the switch SW refers to a state where the contact points are separated from each other and no electric current can flow therebetween. The switch SW may be a relay or a contactor, for instance.

Control System

Figure 2:
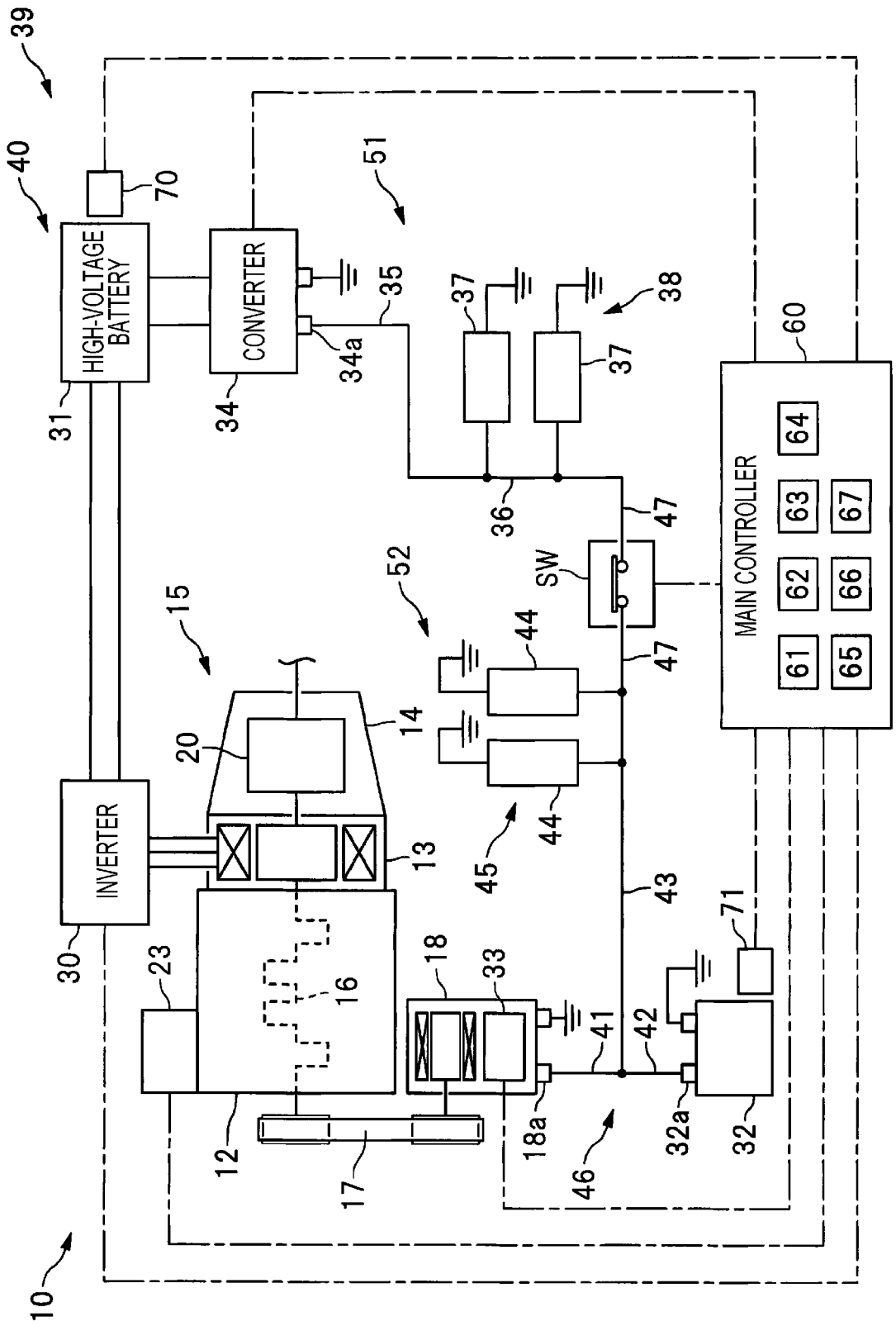
FIG. 2 illustrates an example of a power circuit and a control system provided in the power supply device.

FIG. 2 illustrates an example of the power circuit 39 and a control system provided in the power supply device 10. As illustrated in FIG. 2, the power supply device 10 includes a main controller 60 to operate the power train 15, the power circuit 39, and other members in collaboration with one another. The main controller 60 may be a microcomputer, for instance. The main controller 60 includes: an engine controller 61 that controls the operation of the engine 12; a motor controller 62 that controls the operation of the motor generator 13; an ISG controller 63 that controls the operation of the starter generator 18; a converter controller 64 that controls the operation of the converter 34; and a switch controller 65 that controls the operation of the switch SW. When supplying electric power to the first electrical apparatuses 37 and the second electrical apparatuses 44, the power supply device 10 operates in two power supply modes: a low power mode and a high power mode, details of which will be described later. For this reason, the main controller 60 further includes a first mode controller 66 that executes the low power mode; and a second mode controller 67 that executes the high power mode.

The main controller 60, the ISG controller 33, the inverter 30, the converter 34, the engine accessory 23, and some other members are coupled to one another over an on-board network, such as a controller area network (CAN) or a local interconnect network (LIN), so that these members can communicate with one another. The main controller 60 is coupled to both a battery sensor 70 for the high-voltage battery 31 and a battery sensor 71 for the low-voltage battery 32. The battery sensor 70 transmits information regarding a charge or discharge electric current, an SOC, and some other parameters of the high-voltage battery 31 to the main controller 60. The battery sensor 71 transmits information regarding a charge or discharge electric current, an SOC, and other parameters of the low-voltage battery 32 to the main controller 60. In addition, the ISG controller 33 transmits information regarding a voltage and electric current generated by the starter generator 18 and other parameters to the main controller 60. An unillustrated controller in the converter 34 transmits information regarding a voltage and electric current discharged from the converter 34 and other parameters to the main controller 60.

The battery sensor 70 for the high-voltage battery 31 detects a charge or discharge electric current, a terminal voltage, a temperature, an SOC, and other parameters of the high-voltage battery 31. The "SOC" of the high-voltage battery 31 which indicates a charged state of the high-voltage battery 31 refers to a percentage of a remaining charged amount of the high-voltage battery 31. The "SOC" of the high-voltage battery 31 can be defined as a ratio of a charged amount to fully charged capacity of the high-voltage battery 31. For instance, if the high-voltage battery 31 is fully charged, the SOC is 100%. If the high-voltage battery 31 is fully discharged, the SOC is 0%.

The battery sensor 71 for the low-voltage battery 32 detects a charge or discharge electric current, a terminal voltage, a temperature, an SOC, and other parameters of the low-voltage battery 32. The "SOC" of the low-voltage battery 32 which indicates a charged state of the low-voltage battery 32 refers to a percentage of a remaining charged amount of the low-voltage battery 32. The "SOC" of the low-voltage battery 32 can be defined as a ratio of a charged amount to fully charged capacity of the low-voltage battery 32. For instance, if the low-voltage battery 32 is fully charged, the SOC is 100%. If the low-voltage battery 32 is fully discharged, the SOC is 0%.

Low and High Power Modes

Figure 3:
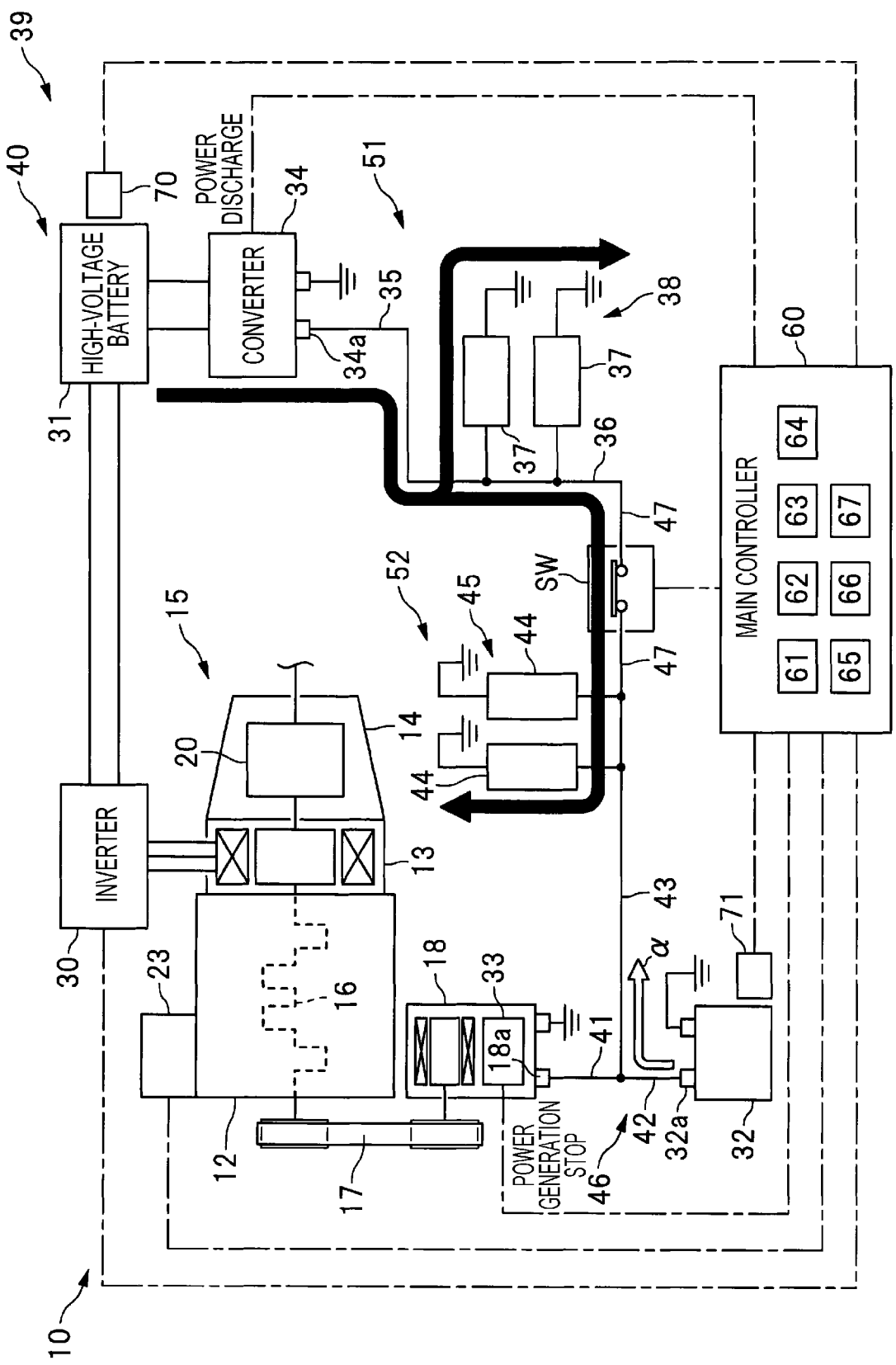
FIG. 3 illustrates an example of a power supply status of the power circuit in a low power mode.
Figure 4:
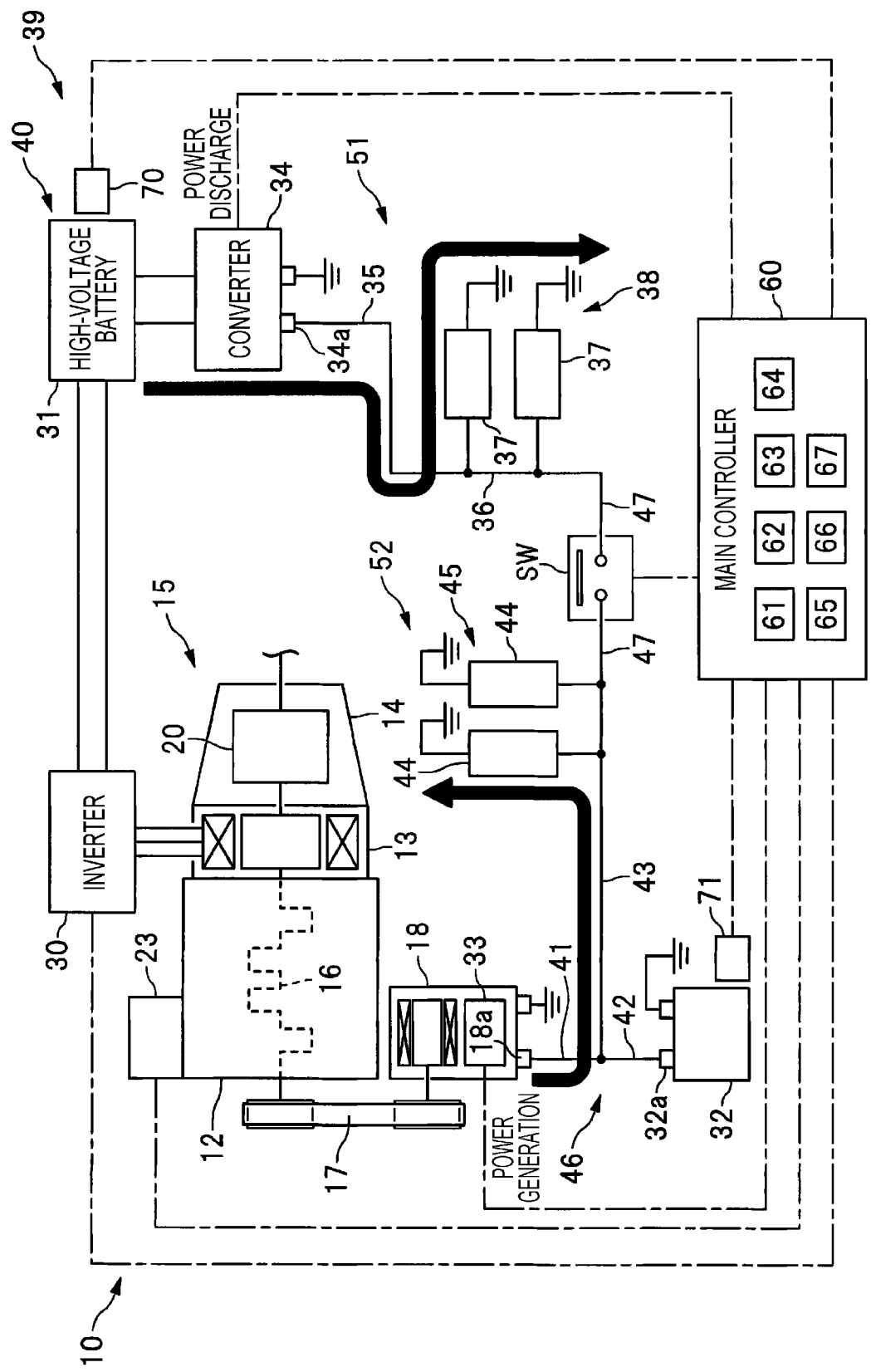
FIG. 4 illustrates an example of a power supply status of the power circuit in a high power mode.

Next, a description will be given below of the power supply mode in which the electric power is supplied to the first electrical apparatuses 37 and the second electrical apparatuses 44. As described above, when supplying electric power to the first electrical apparatuses 37 and the second electrical apparatuses 44, the power supply device 10 operates in the two power supply modes: the low and high power modes. When the power supply device 10 operates in the low power mode, a smaller amount of electric power is supplied, whereas when the power supply device 10 operates in the high power mode, a larger amount of electric power is supplied. FIG. 3 illustrates an example of the power supply status in the low power mode; FIG. 4 illustrates an example of the power supply status in the high power mode. In each of FIGS. 3 and 4, the black arrow indicates the power supply status.

As illustrated in FIG. 3, the low power mode refers to the power supply mode in which the switch SW is turned on and the first power supply 40 in the first power supply system 51 supplies the electric power to the first electrical apparatuses 37 and the second electrical apparatuses 44. In the low power mode, the main controller 60 turns on the switch SW and instructs the converter 34 to discharge the electric power. In response to the instruction, the converter 34 causes the first power supply 40 to discharge the electric power and supplies this electric power to the first electrical apparatuses 37 and to the second electrical apparatuses 44 via the switch SW while regulating the discharged voltage to a target voltage. Simultaneously, the main controller 60 instructs the starter generator 18 to stop generating the electric power. In this case, the engine 12 may operate or may stop operating.

As illustrated in FIG. 4, the high power mode refers to the power supply mode in which the switch SW is turned off, the first power supply 40 in the first power supply system 51 supplies the electric power to the first electrical apparatuses 37, and the second power supply 46 in the second power supply system 52 supplies the electric power to the second electrical apparatuses 44. In the high power mode, the main controller 60 turns off the switch SW and instructs the converter 34 to discharge the electric power and also instructs the starter generator 18 to generate the electric power. In response to the instruction, the converter 34 causes the first power supply 40 to discharge the electric power and supply this electric power to the first electrical apparatuses 37 while regulating the discharged voltage to a target voltage. Likewise, in response to the instruction, the starter generator 18 generates the electric power and supplies this electric power to the second electrical apparatuses 44 while regulating the generated voltage to a target voltage. In this case, the engine 12 operates to set the starter generator 18 in order to the power generation state.

Control of Switching Power Supply Mode: Timing Chart

Figure 5:
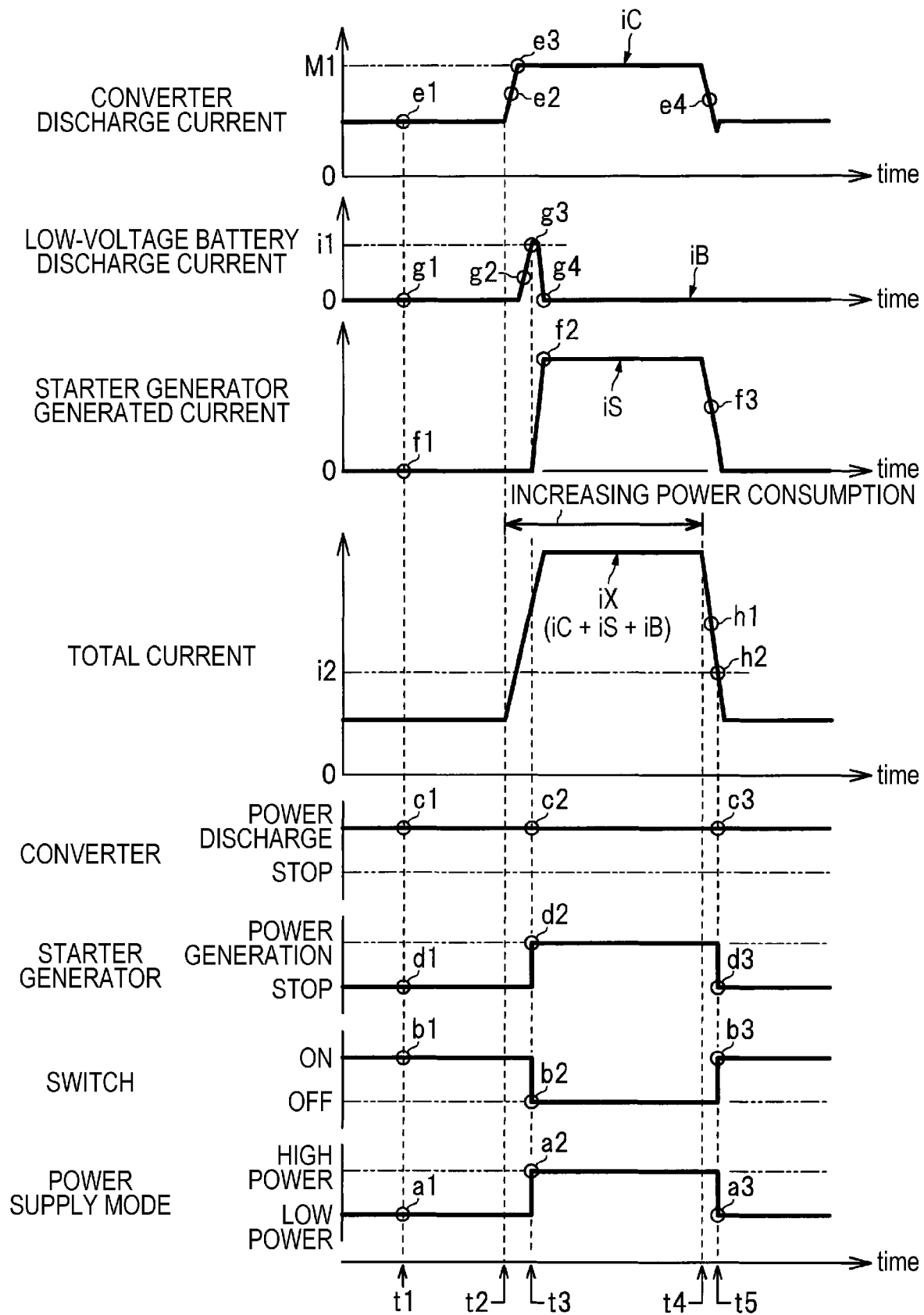
FIG. 5 is a timing chart of an example of the switching between the low power mode and the high power mode.

A description will be given of the control of the switching between the low and high power modes. The main controller 60 switches the power supply mode between the low and high power modes, based on the electric currents discharged from the converter 34 and from the low-voltage battery 32 and the electric current generated by the starter generator 18. FIG. 5 is a timing chart of an example of the switching between the low and high power modes. In this timing chart, the main controller 60 first switches from the low power mode to the high power mode and then switches from the high power mode to the low power mode. A total electric current iX is equal to the sum of a discharge electric current iC of the converter 34, a generated electric current iS of the starter generator 18, and a discharge electric current iB of the low-voltage battery 32. In other words, the total electric current iX is equal to the sum of the discharge electric currents of the first power supply 40 and the second power supply 46, or is equivalent to the total electric current consumed by the first electrical apparatuses 37 and the second electrical apparatuses 44.

At a time t1 in FIG. 5, the power supply mode is the low power mode, as indicated by a1; the switch SW is in the ON state, as indicated by b1; the converter 34 is discharging the electric power, as indicated by c1; and the starter generator 18 stops generating the electric power, as indicated by d1. As a result, the converter 34 supplies the electric power to the first electrical apparatuses 37 and to the second electrical apparatuses 44 via the switch SW, as illustrated in FIG. 3. In addition, the converter 34 outputs a predetermined amount of discharge electric current iC, as indicated by e1; the starter generator 18 outputs almost zero generated electric current iS, as indicted by f1; and the low-voltage battery 32 outputs almost zero discharge electric current iB, as indicted by g1.

At a time t2 in FIG. 5, the first electrical apparatuses 37 and the second electrical apparatuses 44 consume an increasing amount of electric power, because a sheet heater, which is one of the first electrical apparatuses 37 and the second electrical apparatuses 44, is activated. In response, the converter 34 supplies an increasing amount of discharge electric current iC to the first electrical apparatuses 37 and the second electrical apparatuses 44, as indicated by e2. Then, when the discharge electric current iC of the converter 34 reaches an upper limit M1, as indicated by e3, the low-voltage battery 32 starts outputting the electric current to all of the first electrical apparatuses 37 and the second electrical apparatuses 44, as indicated by g2. In short, when the amount of electric power from the converter 34 to the first electrical apparatuses 37 and the second electrical apparatuses 44 becomes insufficient, the low-voltage battery 32 starts supplying the electric power to the first electrical apparatuses 37 and the second electrical apparatuses 44, as indicated by the arrow a in FIG. 3, thereby compensating for the power shortage.

At a time t3 in FIG. 5, when the discharge electric current iB of the low-voltage battery 32 exceeds a threshold i1, as indicated by g3, the main controller 60 switches the power supply mode from the low power mode to the high power mode, as indicated by a2. This is because the capacity of the converter 34 to discharge the electric power becomes deficient in this situation. Hence, the main controller 60 executes the high power mode by causing the first power supply 40 to discharge the electric power and the starter generator 18 to generate the electric power. When switching the power supply mode to the high power mode, as indicated by a2, the main controller 60 turns off the switch SW, as indicated by b2. Then, the starter generator 18 starts generating the electric power, as indicated by d2 while the converter 34 continues to discharge the electric power, as indicated by c2. As a result, the converter 34 supplies the electric power to the first electrical apparatuses 37, and simultaneously the starter generator 18 supplies the electric power to the second electrical apparatuses 44, as illustrated in FIG. 4. In this case, the generated electric current iS of the starter generator 18 increases, as indicated by f2 in FIG. 5, whereas the discharge electric current iB of the low-voltage battery 32 decreases to about zero, as indicated by g4.

At a time t4 in FIG. 5, the sheet heater stops operating, and accordingly the total power consumption of the first electrical apparatuses 37 and the second electrical apparatuses 44 starts decreasing. Then, the discharge electric current iC of the converter 34 which is supplied to the first electrical apparatuses 37 decreases, as indicated by e4, and the generated electric current iS of the starter generator 18 which is supplied to the second electrical apparatuses 44 also decreases, as indicated by f3.

In other words, when the total power consumption of the first electrical apparatuses 37 and the second electrical apparatuses 44 starts decreasing, the total electric current iX flowing through the first electrical apparatuses 37 and the second electrical apparatuses 44 decreases, as indicated by h1. At a time t5, when the total electric current iX decreases below a threshold i2, as indicated by h2, the main controller 60 switches the power supply mode from the high power mode to the low power mode, as indicated by a3. This is because the converter 34 can solely supply a sufficient amount of electric power to all of the first electrical apparatuses 37 and the second electrical apparatuses 44. Hence, the main controller 60 executes the low power mode by causing the starter generator 18 to stop generating the electric power. Then, the switch SW is switched on, as indicated by b3, and the starter generator 18 stops generating the electric power, as indicated by d3, while the converter 34 continues to discharge the electric power, as indicated by c3.

Control of Switching Power Supply Mode: Flowchart

Next, a description will be given below of the control of the switching the power supply mode, described above, with reference to FIG. 6, which is a flowchart of an example of a process of switching the power supply mode. In this flowchart, the character "ISG" denotes the starter generator 18.

Figure 6:
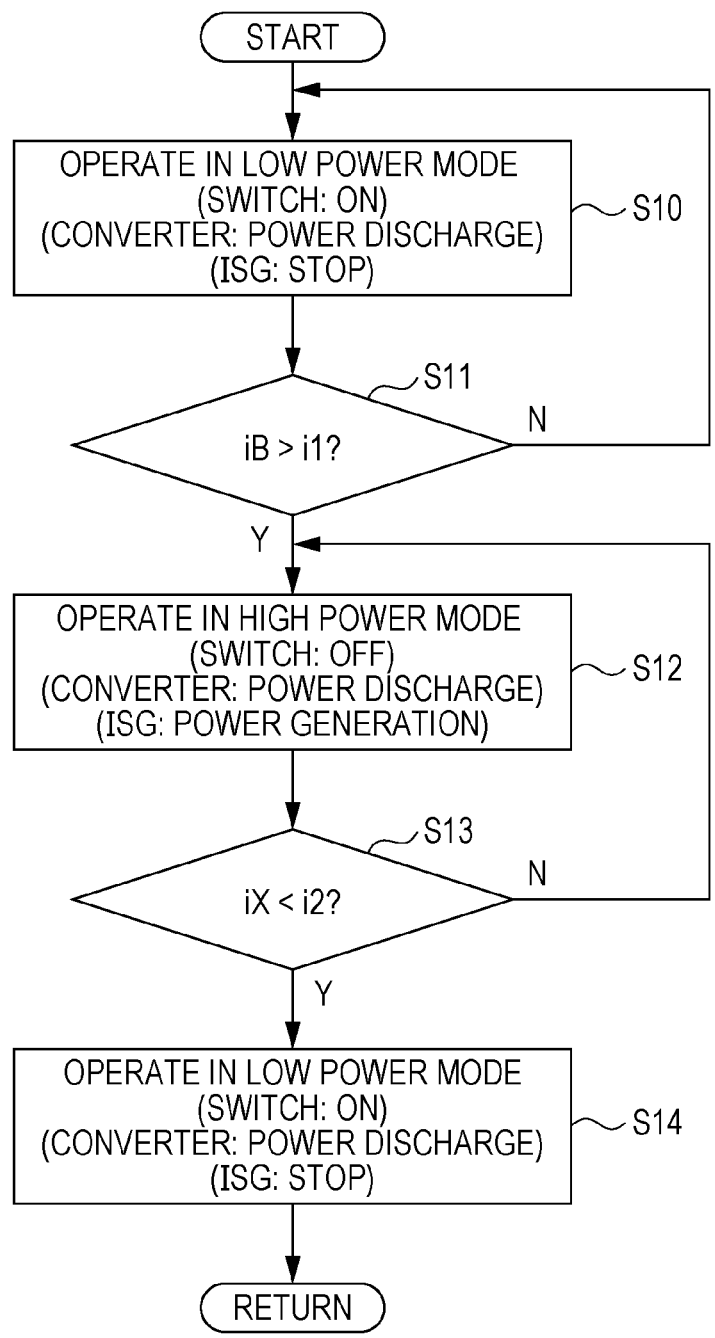
FIG. 6 is a flowchart of an example of a process of switching the power supply mode.

Referring to FIG. 6, at Step S10, the main controller 60 sets the power supply mode to the low power mode. In the low power mode, the main controller 60 turns on the switch SW, and instructs the converter 34 to discharge the electric power and also instructs the starter generator 18 to stop generating the electric power. At Step S11, the main controller 60 determines whether the discharge electric current iB of the low-voltage battery 32 exceeds the threshold i1. When determining that the discharge electric current iB does not exceed the threshold i1 (N at step S11), the main controller 60 considers that the converter 34 can supply a sufficient amount of electric power to all of the first electrical apparatuses 37 and the second electrical apparatuses 44. Thus, the main controller 60 returns to Step S10, at which the main controller 60 maintains the low power mode in which the converter 34 solely supplies the electric power.

When determining that the discharge electric current iB exceeds the threshold i1 (Y at step S11), the main controller 60 considers that the converter 34 may fail to supply a sufficient amount of electric power to all of the first electrical apparatuses 37 and the second electrical apparatuses 44. Thus, the main controller 60 proceeds to Step S12, at which the main controller 60 sets the power supply mode to the high power mode. In the high power mode, the main controller 60 turns off the switch SW. Then, the main controller 60 instructs the converter 34 to discharge the electric power and also instructs the starter generator 18 to generate the electric power. At Step S13, the main controller 60 determines whether the total electric current iX supplied from the first power supply 40 and the second power supply 46 is less than the threshold i2. When determining that the total electric current iX is not less than the threshold i2 (N at Step S13), the main controller 60 considers that the converter 34 has difficulty solely supplying a sufficient amount of electric power to all of the first electrical apparatuses 37 and the second electrical apparatuses 44. Thus, the main controller 60 returns to Step S12, at which the main controller 60 maintains the high power mode in which both the converter 34 and the starter generator 18 supply the electric power.

When determining that the total electric current iX is less than the threshold i2 (Y at Step S13), the main controller 60 considers that the converter 34 can solely supply a sufficient amount of electric power to all of the first electrical apparatuses 37 and the second electrical apparatuses 44. Thus, the main controller 60 proceeds to Step S14, at which the main controller 60 sets the power supply mode to the low power mode by instructing the starter generator 18 to stop generating the electric power. In the low power mode, the main controller 60 turns on the switch SW. Then, the main controller 60 instructs the converter 34 to discharge the electric power and also instructs the starter generator 18 to stop generating the electric power.

As described above, when the total power consumption of the first electrical apparatuses 37 and the second electrical apparatuses 44 decreases, the main controller 60 sets the power supply mode to the low power mode, in which case the converter 34 solely supplies the electric power to all of the first electrical apparatuses 37 and the second electrical apparatuses 44. When the total power consumption of the first electrical apparatuses 37 and the second electrical apparatuses 44 increases, the main controller 60 sets the power supply mode to the high power mode, in which case the converter 34 supplies the electric power to the first electrical apparatuses 37 and simultaneously the starter generator 18 supplies the electric power to the second electrical apparatuses 44. Since both of the converter 34 and the starter generator 18 supply the electric power in this manner, the converter 34 does not necessarily have to solely discharge a large amount of electric power, and can be made compact and low-cost accordingly. Likewise, the starter generator 18 does not necessarily have to generate a large amount of electric power and can be made compact and low-cost accordingly. Consequently, both of the first power supply 40 and the second power supply 46 can supply sufficient amounts of electric power to all of the first electrical apparatuses 37 and the second electrical apparatuses 44 although each of their outputs, namely, power supply capacities is low. This configuration contributes to the compactness and cost reduction of the first power supply 40 and the second power supply 46.

When the discharge electric current iB of the low-voltage battery 32 exceeds the threshold i1 in the low power mode, the main controller 60 switches the power supply mode from the low power mode to the high power mode. This configuration can accurately detect that the amount of the electric power supplied becomes insufficient in the low power mode and can timely switch the power supply mode from the low power mode to the high power mode. When the total electric current iX supplied from the first power supply 40 and the second power supply 46 decreases below the threshold i2 in the high power mode, the main controller 60 switches the power supply mode from the high power mode to the low power mode. This configuration can accurately detect that the amount of the electric power supplied becomes sufficiently high in the low power mode and can timely switch the power supply mode from the high power mode to the low power mode.

When executing the high power mode, the main controller 60 turns off the switch SW to separate a first circuit from a second circuit; the first circuit supplies the electric power from the converter 34 to the first electrical apparatuses 37, and the second circuit supplies the electric power from the starter generator 18 to the second electrical apparatuses 44.

In other words, when executing the high power mode, the main controller 60 separates the first power supply system 51 from the second power supply system 52. This configuration can independently regulate the voltages discharged from the converter 34 and generated by the starter generator 18 and thus can easily control the operations of the converter 34 and the starter generator 18. If both a converter and a starter generator supply electric power to first and second electrical apparatuses while a first power supply system is coupled to a second power supply system, a main controller needs to calculate the sum of a voltage discharged from the converter and a voltage generated by the starter generator. However, this configuration can eliminate the need to make such complicated voltage calculations.

Another Example: Low and High Power Modes

When executing either of the low and high power modes as illustrated in FIGS. 3 and 4, the converter 34 causes the high-voltage battery 31 to discharge the electric power, thereby supplying the electric power charged in the high-voltage battery 31 to the first electrical apparatuses 37 and/or the second electrical apparatuses 44. However, if the SOC of the high-voltage battery 31 decreases, the converter 34 may fail to supply a sufficient amount of electric power to the first electrical apparatuses 37 and/or the second electrical apparatuses 44. For this reason, when the SOC of the high-voltage battery 31 decreases in the low or high power mode, the main controller 60 may rotate an engine 12 to cause the motor generator 13 to generate electric power, thereby charging the high-voltage battery 31.

Figure 7:
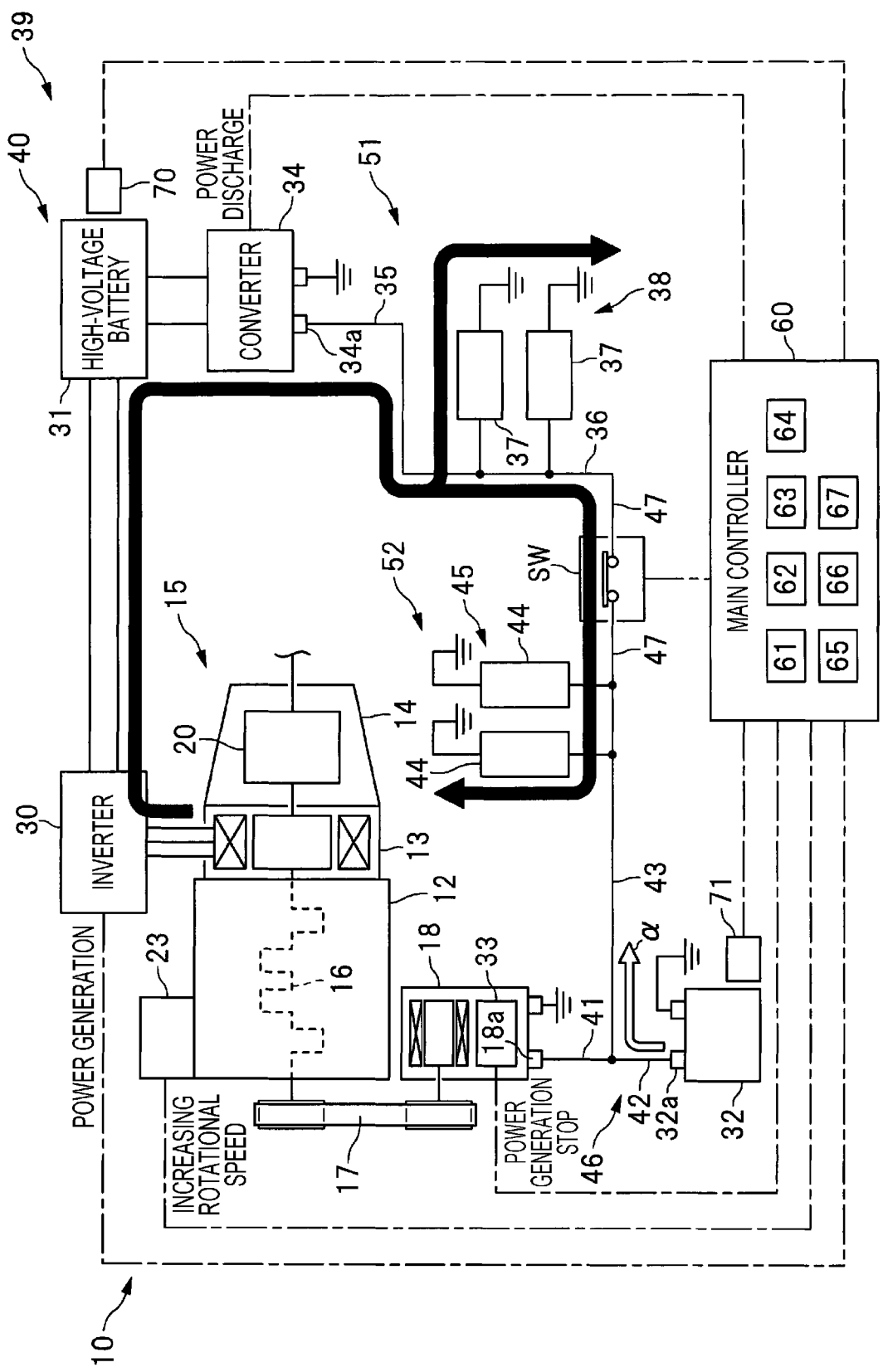
FIG. 7 illustrates another example of the power supply status in the low power mode.

FIG. 7 illustrates another example of the power supply status in the low power mode. In FIG. 7, the black arrow indicates the power supply status. As illustrated in FIG. 7, when the SOC of the high-voltage battery 31 decreases in the low power mode, the main controller 60 may instruct an engine accessory 23 to rotate at an increasing speed and may also instruct the inverter 30 to generate the electric power. In response to the respective instructions, the engine accessory 23 may rotate the engine 12 at an increasing speed, and the inverter 30 may cause the motor generator 13 to generate the electric power. In this way, the motor generator 13 charges the high-voltage battery 31 so that the converter 34 can continue to supply the electric power to the first electrical apparatuses 37 and the second electrical apparatuses 44.

As in the configuration of FIG. 3, the motor generator 13 generates the electric power in the low power mode; however, the motor generator 13 may also generate the electric power in different cases. Alternatively, the motor generator 13 may generate the electric power in the high power mode when the SOC of the high-voltage battery 31 decreases. It is obvious that a clutch mechanism 19 is engaged when the engine 12 drives the motor generator 13.

Another Example: Low Power Mode

Figure 8:
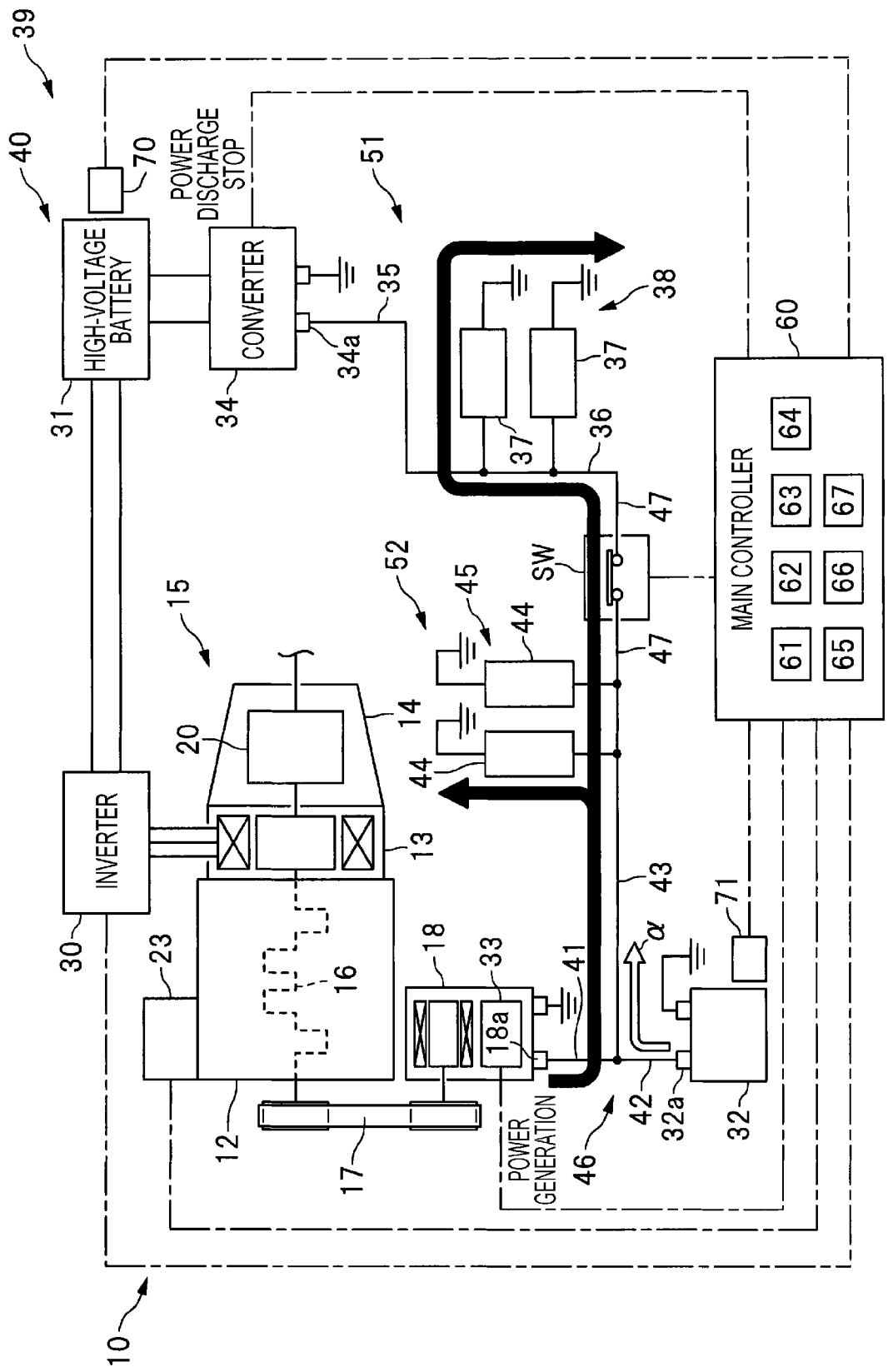
FIG. 8 illustrates still another example of the power supply status in the low power mode.

As in the configuration of FIG. 3, when the main controller 60 executes the low power mode, the converter 34 supplies the electric power to the first electrical apparatuses 37 and to the second electrical apparatuses 44 via the switch SW; however, the converter 34 does not necessarily have to supply the electric power in the low power mode. FIG. 8 illustrates still another example of the power supply status in the low power mode. In FIG. 8, the black arrow indicates the power supply status.

As illustrated in FIG. 8, when a main controller 60 executes a low power mode, a starter generator 18 may supply electric power to second electrical apparatuses 44 and first electrical apparatuses 37 via a switch SW. In the low power mode, the main controller 60 may turn on the switch SW and may instruct the starter generator 18 to generate electric power. In response to the instruction, the starter generator 18 may supply the electric power to the second electrical apparatuses 44 in a second electrical apparatus group 45 and the first electrical apparatuses 37 in a first electrical apparatus group 38 via the switch SW while regulating the generated voltage to a target voltage. Simultaneously, the main controller 60 may instruct a converter 34 to stop discharging electric power. In this case, an engine 12 may operate.

Even if the starter generator 18 generates the electric power in the low power mode, when a discharge electric current iB of a low-voltage battery 32 exceeds a threshold i1, the main controller 60 may switch the power supply mode to the high power mode, as described with reference to FIG. 4. In other words, if the starter generator 18 fails to supply a sufficient amount of electric power to the first electrical apparatuses 37 and the second electrical apparatuses 44, the low-voltage battery 32 may also supply electric power to the first electrical apparatuses 37 and the second electrical apparatuses 44 as indicated by the arrow α in FIG. 8, thereby compensating for the power shortage. Thus, when the discharge electric current iB of the low-voltage battery 32 exceeds the threshold i1, the main controller 60 may consider that the capacity of the starter generator 18 to generate the electric power becomes deficient and may execute the high power mode, in which case the starter generator 18 generates the electric power and simultaneously the converter 34 discharges the electric power.

Control of Switch During Start-Up of Engine

Figure 9:
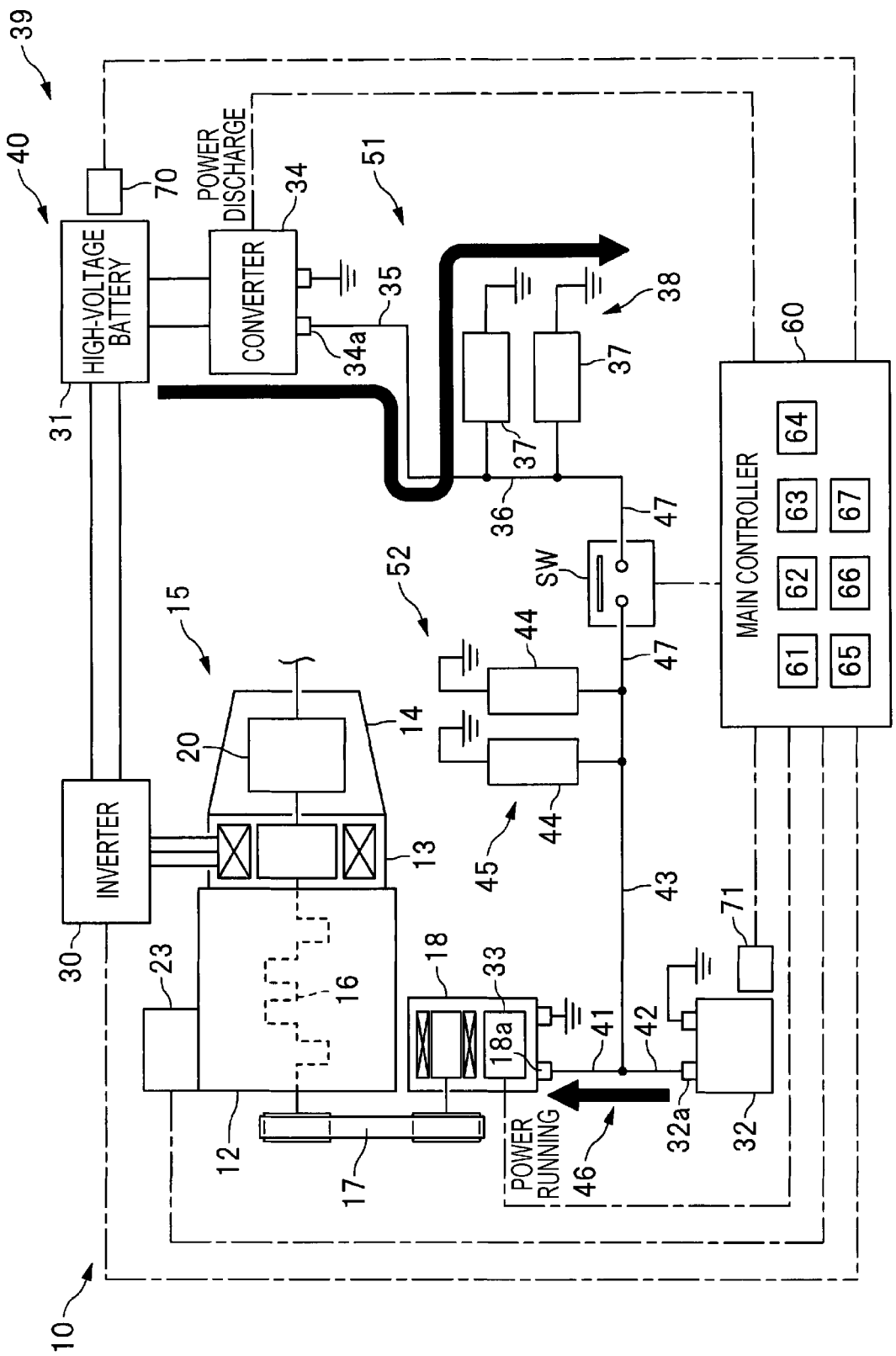
FIG. 9 illustrates an example of the power supply status during the start-up of the engine.

As described above, the switch SW is disposed between the first power supply system 51 and the second power supply system 52. The switch SW couples the first power supply system 51 to the second power supply system 52 or separates the first power supply system 51 from the second power supply system 52. When the starter generator 18 starts rotating the engine 12 in order to help the first electrical apparatuses 37 operate properly, the switch SW is turned off. FIG. 9 illustrates an example of the power supply status during the start-up of the engine 12. In FIG. 9, the black arrows indicate the power supply status.

As illustrated in FIG. 9, when a starter generator 18 starts rotating an engine 12, a main controller 60 may turn off a switch SW. Then, the starter generator 18 may instruct a converter 34 to discharge electric power and may also instruct the starter generator 18 to enter a power running state. Thus, when the starter generator 18 enters the power running state during the start-up of the engine 12, the main controller 60 may turn off the switch SW to separate a first power supply system 51 from a second power supply system 52. This configuration blocks the electric power from being supplied from the first power supply system 51 to the starter generator 18 even if the starter generator 18 rapidly consumes an increasing amount of electric power in response to a cranking operation. Consequently, it is possible to control an instantaneous drop of a voltage that the first power supply system 51 applies to first electrical apparatuses 37, thereby helping the first electrical apparatuses 37 properly.

In the configuration of FIG. 9, the first electrical apparatuses 37 provided in the first power supply system 51 may maintain their operational states when the engine 12 starts up. Examples of the first electrical apparatuses 37 include various instrument panels, controllers, brake actuators, and steering actuators. Second electrical apparatuses 44 provided in the second power supply system 52 may be permitted to stop operating when the engine 12 starts up. Examples of the second electrical apparatuses 44 include sheet heaters, side mirror motors, power window motors, and radiator fan motors.

Another Example: Control of Switch During Start-Up of Engine

Figure 10:
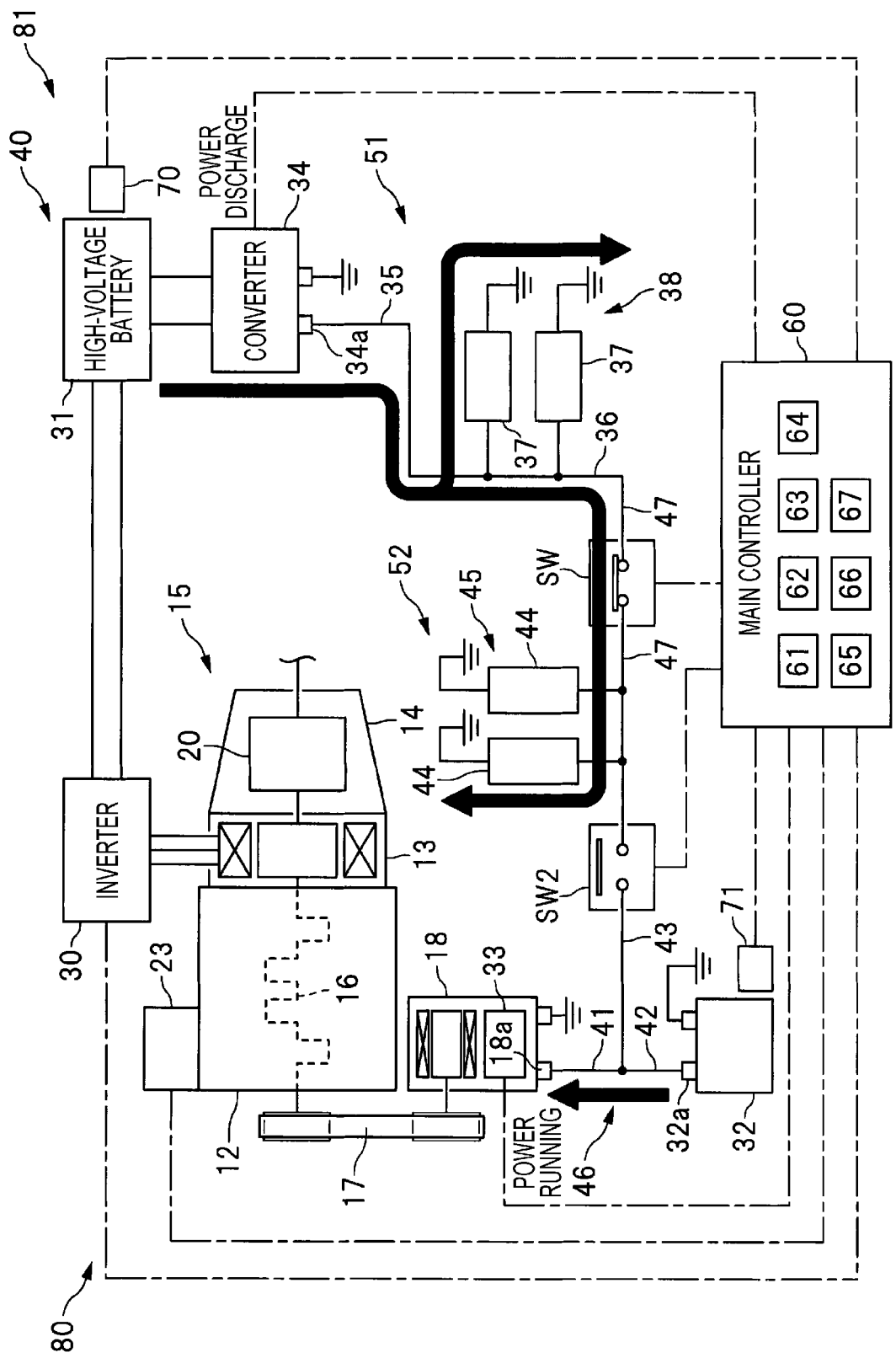
FIG. 10 illustrates an example of a power circuit provided in a power supply device for a vehicle according to another embodiment of the disclosure.

In the configuration of FIG. 9, the first electrical apparatuses 37 maintain their operational states when the engine 12 starts up, whereas the second electrical apparatuses 44 are permitted to stop operating when the engine 12 starts up. However, characteristics of the first electrical apparatuses 37 and the second electrical apparatuses 44 are not limited. Alternatively, all of the first electrical apparatuses 37 and the second electrical apparatuses 44 may maintain their operational states when the engine 12 starts up. FIG. 10 illustrates an example of a power circuit 81 provided in a power supply device 80 according to another example of the disclosure. In FIG. 10, the black arrows indicate the power supply status when an engine 12 starts up. Members and components in FIG. 10 which are substantially identical to those illustrated in FIG. 2 are given the same reference characters and will not be described below.

As illustrated in FIG. 10, the power circuit 81 provided in the power supply device 80 may be equipped with a first power supply system 51 that includes: a first power supply 40 having a motor generator 13 and a high-voltage battery 31; and a plurality of first electrical apparatuses 37 coupled to the first power supply 40. In one example, the motor generator 13 may serve as a first generator, and the high-voltage battery 31 may serve as a first power storage. The power circuit 81 provided in the power supply device 80 may be equipped with a second power supply system 52 that includes: a second power supply 46 having a starter generator 18 and a low-voltage battery 32; and a plurality of second electrical apparatuses 44 coupled to the second power supply 46. In one example, the starter generator 18 may serve as a second generator and a generator motor, and the low-voltage battery 32 may serve as a second power storage. The first electrical apparatuses 37 and the second electrical apparatuses 44 may maintain their operational states when the engine 12 starts up.

Between the first power supply system 51 and the second power supply system 52 may be a switch SW that is turned on or off. Between the second power supply 46 in the second power supply system 52 and each second electrical apparatus 44 may be a switch SW2 that is turned on or off. In one example, the switch SW may serve as a first switch, and the switch SW2 may be a second switch. For instance, each of the switches SW and SW2 may be a semiconductor switch made of a MOSFET or a mechanical switch that utilizes electromagnetic force.

As illustrated in FIG. 10, when the starter generator 18 starts rotating the engine 12, a main controller 60 turns on the switch SW but turns off the switch SW2. Then, the main controller 60 instructs a converter 34 to discharge electric power and also instructs the starter generator 18 to enter a power running state. In short, when the starter generator 18 enters the power running state during the start-up of the engine 12, the main controller 60 turns on the switch SW but turns off the switch SW2, thereby separating the starter generator 18 from the first electrical apparatuses 37 and the second electrical apparatuses 44. This configuration controls an instantaneous drop of a voltage applied to the first electrical apparatuses 37 and the second electrical apparatuses 44 even if the starter generator 18 rapidly consumes a large amount of electric power during the start-up of the engine 12. Consequently, it is possible to help the first electrical apparatuses 37 and the second electrical apparatuses 44 operate properly.

It is obvious that the disclosure is not limited to the foregoing example, and various modifications are possible within the scope of the claims. In the foregoing example, the converter 34 that decreases the direct-current (DC) power is disposed in the first power supply 40, because the voltage of the high-voltage battery 31 is higher than that of the low-voltage battery 32. However, the converter 34 may be removed from the first power supply 40, in which case the high-voltage battery 31 may be directly coupled in parallel to the low-voltage battery 32 and the difference in voltage between the high-voltage battery 31 and the low-voltage battery 32 may be set to within an allowable range.

The high-voltage battery 31 does not necessarily have to be a lithium ion battery or a lead battery with a terminal voltage of about 100 V. Alternatively, the high-voltage battery 31 may be a power storage with a terminal voltage other than 100 V or may be a capacitor or other type of battery. Likewise, the low-voltage battery 32 does not necessarily have to be a lithium ion battery or a lead battery with a terminal voltage of about 12 V. Alternatively, the low-voltage battery 32 may be a power storage with a terminal voltage other than 12 V or may be a capacitor or other type of battery.

In the foregoing example, the motor generator 13 serves as both a generator and a motor; however, the motor generator 13 may serve as a generator alone. Likewise, the starter generator 18 serves as both a generator and a motor; however, the starter generator 18 may serve as a generator alone.

When the starter generator 18 enters the power running state during the startup of the engine 12, the switch SW is turned off as in the configuration of FIG. 9, and when the starter generator 18 enters the power running state during the startup of the engine 12, the switch SW2 is turned off as in the configuration of FIG. 10; however, the timings when the switches SW and SW2 are turned off is not limited. Alternatively, both the switches SW and SW2 may be turned off when a high-power, electrically-driven actuator starts operating, so that it is possible to suppress the voltages applied to the first electrical apparatuses 37 and the second electrical apparatuses 44 from dropping instantaneously.

In the foregoing example, the engine controller 61, the motor controller 62, the ISG controller 63, the converter controller 64, the switch controller 65, the first mode controller 66, and the second mode controller 67 are all disposed in the main controller 60. However, the configuration of these controllers is not limited. Alternatively, the engine controller 61, the motor controller 62, the ISG controller 63, the converter controller 64, the switch controller 65, the first mode controller 66, and the second mode controller 67 may be disposed in another controller or may be disposed separately in other controllers.

In an example of the disclosure, when a power supply device 10 operates in a low power mode, if a discharge electric current of a second power supply 46 exceeds a threshold, a main controller 60 switches the power supply mode from the low power mode to a high power mode. In this way, the power supply device 10 can supply sufficient amounts of electric power to first electrical apparatuses 37 and second electrical apparatuses 44 with the outputs of a first power supply 40 and the second power supply 46 lowered.

The invention claimed is:

1. A power supply device to be mounted in a vehicle, the device comprising:
a first power supply system comprising a first power supply and a first electrical apparatus coupled to the first power supply, the first power supply comprising a first power storage and a first generator;
a second power supply system comprising a second power supply and a second electrical apparatus coupled to the second power supply, the second power supply comprising a second power storage and a second generator;
a switch disposed between the first power supply system and the second power supply system, the switch configured to be turned on to couple the first power supply system to the second power supply system or turned off to separate the first power supply system from the second power supply system;
a first mode controller configured to execute, as a power supply mode, a low power mode in which the switch is turned on to supply electric power from one of the first power supply and the second power supply to both the first electrical apparatus and the second electrical apparatus; and
a second mode controller configured to execute, as the power supply mode, a high power mode in which the switch is turned off to supply electric power from the first power supply to the first electrical apparatus and to supply electric power from the second power supply to the second electrical apparatus,
wherein when a discharge electric current of the second power supply exceeds a threshold during execution of the low power mode, the second mode controller switches the power supply mode from the low power mode to the high power mode.

2. The power supply device according to claim 1, wherein when a sum of a discharge electric current of the first power supply and the discharge electric current of the second power supply decreases below a threshold during execution of the high power mode, the first mode controller switches the power supply mode from the high power mode to the low power mode.

3. The power supply device according to claim 1, wherein a voltage of the first power storage is higher than a voltage of the second power storage, and
the first power supply has a converter configured to convert the voltage of the first power supply.

4. The power supply device according to claim 2, wherein a voltage of the first power storage is higher than a voltage of the second power storage, and
the first power supply has a converter configured to convert the voltage of the first power supply.

5. The power supply device according to claim 1, wherein the second generator is a generator motor that enters a power running state when an engine starts up,
the first electrical apparatus maintains an operational state when the engine starts up,
the second electrical apparatus is permitted to stop operating when the engine starts up, and
the switch is turned off when the engine starts up.

6. The power supply device according to claim 2, wherein the second generator is a generator motor that enters a power running state when an engine starts up,
the first electrical apparatus maintains an operational state when the engine starts up,
the second electrical apparatus is permitted to stop operating when the engine starts up, and
the switch is turned off when the engine starts up.

7. The power supply device according to claim 3, wherein
the second generator is a generator motor that enters a power running state when an engine starts up,
the first electrical apparatus maintains an operational state when the engine starts up,
the second electrical apparatus is permitted to stop operating when the engine starts up, and
the switch is turned off when the engine starts up.

8. The power supply device according to claim 4, wherein
the second generator is a generator motor that enters a power running state when an engine starts up,
the first electrical apparatus maintains an operational state when the engine starts up,
the second electrical apparatus is permitted to stop operating when the engine starts up, and
the switch is turned off when the engine starts up.

9. The power supply device according to claim 1, wherein
the second generator is a generator motor that enters a power running state when an engine starts up,
the switch is a first switch,
the power supply device further comprises a second switch between the second power supply and the second electrical apparatus, the second switch being configured to be turned on or off,
the first switch is turned on when the engine starts up, and
the second switch is turned off when the engine starts up.

10. The power supply device according to claim 2, wherein
the second generator is a generator motor that enters a power running state when an engine starts up,
the switch is a first switch,
the power supply device further comprises a second switch between the second power supply and the second electrical apparatus, the second switch being configured to be turned on or off,
the first switch is turned on when the engine starts up, and
the second switch is turned off when the engine starts up.

11. The power supply device according to claim 3, wherein
the second generator is a generator motor that enters a power running state when an engine starts up,
the switch is a first switch,
the power supply device further comprises a second switch between the second power supply and the second electrical apparatus, the second switch being configured to be turned on or off,
the first switch is turned on when the engine starts up, and
the second switch is turned off when the engine starts up.

12. The power supply device according to claim 4, wherein
the second generator is a generator motor that enters a power running state when an engine starts up,
the switch is a first switch,
the power supply device further comprises a second switch between the second power supply and the second electrical apparatus, the second switch being configured to be turned on or off,
the first switch is turned on when the engine starts up, and
the second switch is turned off when the engine starts up.

13. The power supply device according to claim 5, wherein
the second generator is a generator motor that enters a power running state when an engine starts up,
the switch is a first switch,
the power supply device further comprises a second switch between the second power supply and the second electrical apparatus, the second switch being configured to be turned on or off,
the first switch is turned on when the engine starts up, and
the second switch is turned off when the engine starts up.

14. The power supply device according to claim 6, wherein
the second generator is a generator motor that enters a power running state when an engine starts up,
the switch is a first switch,
the power supply device further comprises a second switch between the second power supply and the second electrical apparatus, the second switch being configured to be turned on or off,
the first switch is turned on when the engine starts up, and
the second switch is turned off when the engine starts up.

15. The power supply device according to claim 7, wherein
the second generator is a generator motor that enters a power running state when an engine starts up,
the switch is a first switch,
the power supply device further comprises a second switch between the second power supply and the second electrical apparatus, the second switch being configured to be turned on or off,
the first switch is turned on when the engine starts up, and
the second switch is turned off when the engine starts up.

16. The power supply device according to claim 8, wherein
the second generator is a generator motor that enters a power running state when an engine starts up,
the switch is a first switch,
the power supply device further comprises a second switch between the second power supply and the second electrical apparatus, the second switch being configured to be turned on or off,
the first switch is turned on when the engine starts up, and
the second switch is turned off when the engine starts up.

17. A power supply device to be mounted in a vehicle, the device comprising:
a first power supply system comprising a first power supply and a first electrical apparatus coupled to the first power supply, the first power supply comprising a first power storage and a first generator;
a second power supply system comprising a second power supply and a second electrical apparatus coupled to the second power supply, the second power supply comprising a second power storage and a second generator;
a switch disposed between the first power supply system and the second power supply system, the switch configured to be turned on to couple the first power supply system to the second power supply system or turned off to separate the first power supply system from the second power supply system;
circuitry configured to
execute, as a power supply mode, a low power mode in which the switch is turned on to supply electric power from one of the first power supply and the second power supply to both the first electrical apparatus and the second electrical apparatus, and
execute, as the power supply mode, a high power mode in which the switch is turned off to supply electric power from the first power supply to the first electrical apparatus and to supply electric power from the second power supply to the second electrical apparatus,
wherein when a discharge electric current of the second power supply exceeds a threshold during execution of the low power mode, the circuitry switches the power supply mode from the low power mode to the high power mode.

\* \* \* \* \*